(12) United States Patent
Ottar et al.

(10) Patent No.: US 12,450,400 B2
(45) Date of Patent: Oct. 21, 2025

(54) OUT OF BAND COMPONENT VALIDATION

(71) Applicant: Dell Products L.P., Round Rock, TX (US)

(72) Inventors: Vinodkumar Vasudev Ottar, Mckinney, TX (US); Abeye Teshome, Austin, TX (US); Richard M. Tonry, Georgetown, TX (US); Bassem El-Azzami, Austin, TX (US); Mohit Arora, Frisco, TX (US); Luis Antonio Valencia Reyes, Waxahachie, TX (US); Adolfo Sandor Montero, Pflugerville, TX (US); Rajaravi Chandra Kollarapu, Allen, TX (US); Amy Christine Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 18/498,345

(22) Filed: Oct. 31, 2023

(65) Prior Publication Data
US 2025/0139298 A1 May 1, 2025

(51) Int. Cl.
*G06F 21/73* (2013.01)
(52) U.S. Cl.
CPC .................. *G06F 21/73* (2013.01)
(58) Field of Classification Search
CPC ........................................ G06F 21/73
See application file for complete search history.

(56) References Cited

U.S. PATENT DOCUMENTS

| | | | |
|---|---|---|---|
| 7,024,695 B1 * | 4/2006 | Kumar | H04L 63/083 726/26 |
| 7,171,395 B1 * | 1/2007 | Belgardt | G06F 11/2038 |
| 7,318,102 B1 * | 1/2008 | Krause | H04L 1/1635 709/227 |
| 7,599,907 B2 | 10/2009 | Havewala et al. | |
| 7,802,092 B1 * | 9/2010 | Kelly | H04L 63/0823 713/175 |
| 8,020,192 B2 | 9/2011 | Wright et al. | |
| 8,490,163 B1 | 7/2013 | Harsell et al. | |
| 8,560,823 B1 * | 10/2013 | Aytek | G06F 8/654 713/2 |
| 8,850,186 B2 | 9/2014 | Yamauchi | |
| 9,191,781 B2 | 11/2015 | Kumar | |
| 9,246,678 B2 | 1/2016 | Nayshtut et al. | |
| 9,349,009 B2 | 5/2016 | Rivera | |
| 9,721,111 B2 | 8/2017 | Cavanaugh | |
| 9,721,175 B2 | 8/2017 | Kursun et al. | |

(Continued)

*Primary Examiner* — Aravind K Moorthy
(74) *Attorney, Agent, or Firm* — WOMBLE BOND DICKINSON (US) LLP

(57) ABSTRACT

Methods and systems for managing data processing systems are disclosed. The data processing systems may be managed by verifying the integrity of the data processing systems. The integrity may be verified as a prerequisite to use of the data processing systems. The integrity may be verified, at least in part, by verifying that the hardware component loadout of a data processing system is as expected. If the actual hardware component loadout diverges from an expected hardware component loadout, then remedial activity may be performed to address the differences between the actual and expected hardware component loadout.

20 Claims, 6 Drawing Sheets

(56) References Cited

U.S. PATENT DOCUMENTS

| | | | |
|---|---|---|---|
| 9,785,491 B2 | 10/2017 | Cilfone et al. | |
| 10,021,669 B2 | 7/2018 | George | |
| 10,133,867 B1* | 11/2018 | Brandwine | G06F 21/567 |
| 10,163,105 B1 | 12/2018 | Ziraknejad et al. | |
| 10,169,571 B1 | 1/2019 | Attfield et al. | |
| 10,333,903 B1* | 6/2019 | Campagna | H04L 63/0428 |
| 10,395,039 B2 | 8/2019 | Khatri et al. | |
| 10,476,665 B1* | 11/2019 | Griffin | H04L 9/3263 |
| 10,560,448 B1* | 2/2020 | Witten | H04L 63/0823 |
| 10,587,594 B1* | 3/2020 | McClintock | H04L 63/08 |
| 10,630,489 B2 | 4/2020 | Hughes | |
| 10,678,555 B2 | 6/2020 | Johansson et al. | |
| 10,841,295 B1 | 11/2020 | Pecen et al. | |
| 11,332,069 B1* | 5/2022 | Qi | G09F 13/16 |
| 11,397,823 B1* | 7/2022 | Argenti | H04L 9/3247 |
| 11,563,565 B2 | 1/2023 | Yang et al. | |
| 11,574,080 B1* | 2/2023 | Khatri | G06F 21/602 |
| 11,704,384 B2 | 7/2023 | Murphy et al. | |
| 11,735,285 B1* | 8/2023 | Griffin | G11C 29/44 |
| | | | 365/185.09 |
| 11,785,005 B2* | 10/2023 | Vedula | H04L 9/3273 |
| 12,143,265 B1* | 11/2024 | El-Azzami | H04L 41/0806 |
| 12,210,513 B1* | 1/2025 | Obstfeld | G06F 16/2365 |
| 12,210,883 B1* | 1/2025 | Toh | G06F 12/0875 |
| 12,299,127 B2* | 5/2025 | Schooley | G06F 21/554 |
| 2005/0276228 A1* | 12/2005 | Yavatkar | H04L 63/0227 |
| | | | 370/242 |
| 2005/0283826 A1* | 12/2005 | Tahan | G06F 21/575 |
| | | | 726/2 |
| 2005/0289343 A1* | 12/2005 | Tahan | G06F 21/72 |
| | | | 713/169 |
| 2006/0143431 A1* | 6/2006 | Rothman | G06F 11/1417 |
| | | | 714/E11.133 |
| 2007/0011507 A1* | 1/2007 | Rothman | G06F 11/2736 |
| | | | 714/E11.174 |
| 2007/0260911 A1* | 11/2007 | Marilly | H04L 41/0663 |
| | | | 714/4.1 |
| 2007/0271498 A1* | 11/2007 | Schachter | G06F 16/9562 |
| | | | 715/764 |
| 2008/0244267 A1* | 10/2008 | Zimmer | G06F 21/572 |
| | | | 726/17 |
| 2008/0313264 A1* | 12/2008 | Pestoni | H04L 9/3263 |
| | | | 709/202 |
| 2009/0172376 A1* | 7/2009 | Kiiveri | G06F 21/575 |
| | | | 713/2 |
| 2009/0222653 A1* | 9/2009 | Findeisen | G06F 21/575 |
| | | | 713/2 |
| 2009/0276617 A1* | 11/2009 | Grell | G06F 21/575 |
| | | | 713/2 |
| 2010/0169949 A1* | 7/2010 | Rothman | G06F 21/88 |
| | | | 726/4 |
| 2010/0235688 A1* | 9/2010 | Bennah | G06F 11/0706 |
| | | | 714/57 |
| 2010/0318786 A1* | 12/2010 | Douceur | H04L 63/123 |
| | | | 713/155 |
| 2011/0151854 A1* | 6/2011 | Prakash | H04W 52/0225 |
| | | | 455/466 |
| 2011/0179262 A1* | 7/2011 | Hong | G06F 9/4401 |
| | | | 713/2 |
| 2012/0079277 A1* | 3/2012 | Ng | H04L 9/0822 |
| | | | 713/171 |
| 2012/0221899 A1* | 8/2012 | Cervenak | G06Q 10/10 |
| | | | 714/48 |
| 2012/0280823 A1* | 11/2012 | Yang | G08B 21/10 |
| | | | 340/669 |
| 2013/0013905 A1* | 1/2013 | Held | G06F 21/572 |
| | | | 713/2 |
| 2014/0006760 A1* | 1/2014 | Nemiroff | G06F 21/554 |
| | | | 713/180 |
| 2014/0032959 A1* | 1/2014 | Dawkins | G06F 11/2056 |
| | | | 714/E11.089 |
| 2014/0359239 A1* | 12/2014 | Hiremane | G06F 11/0766 |
| | | | 711/163 |
| 2015/0036535 A1* | 2/2015 | Mosko | H04L 45/04 |
| | | | 370/254 |
| 2015/0149359 A1* | 5/2015 | Forte | G06Q 20/085 |
| | | | 705/44 |
| 2015/0199520 A1* | 7/2015 | Woolley | G06F 21/57 |
| | | | 713/2 |
| 2015/0220737 A1* | 8/2015 | Rothman | G06F 21/572 |
| | | | 726/1 |
| 2015/0339476 A1* | 11/2015 | Davis | G06F 21/552 |
| | | | 726/22 |
| 2015/0372825 A1* | 12/2015 | Park | G06F 21/44 |
| | | | 713/156 |
| 2016/0147626 A1* | 5/2016 | Hass | G06F 9/4416 |
| | | | 714/36 |
| 2017/0017655 A1* | 1/2017 | Pinto | G06F 8/33 |
| 2017/0222990 A1* | 8/2017 | Romansky | H04L 9/3268 |
| 2017/0277876 A1 | 9/2017 | Alameh et al. | |
| 2017/0289197 A1 | 10/2017 | Mandyam et al. | |
| 2017/0331583 A1* | 11/2017 | Golcher Ugalde | H04B 10/503 |
| 2018/0006829 A1 | 1/2018 | Kravitz et al. | |
| 2018/0121664 A1* | 5/2018 | Gourley | H04L 63/108 |
| 2018/0359154 A1* | 12/2018 | Millner | H04L 41/12 |
| 2019/0014096 A1* | 1/2019 | Hancock | H04L 9/3263 |
| 2019/0020647 A1* | 1/2019 | Sinha | H04L 63/061 |
| 2019/0103961 A1* | 4/2019 | Chhabra | H04L 9/0838 |
| 2019/0156019 A1 | 5/2019 | Chen | |
| 2019/0158277 A1* | 5/2019 | Edgecombe | H04L 9/3215 |
| 2019/0230002 A1* | 7/2019 | Bernat | H04L 63/0823 |
| 2019/0325139 A1* | 10/2019 | Dewan | H04L 41/082 |
| 2019/0332773 A1* | 10/2019 | Konetski | H04L 63/126 |
| 2020/0021445 A1* | 1/2020 | Caceres | G06F 21/44 |
| 2020/0067922 A1* | 2/2020 | Avetisov | H04L 63/0823 |
| 2020/0213311 A1* | 7/2020 | Saha | H04L 9/3268 |
| 2020/0233983 A1* | 7/2020 | Robison | G06F 21/72 |
| 2020/0267005 A1* | 8/2020 | Parker | G06F 21/33 |
| 2021/0081191 A1* | 3/2021 | Zada | G06F 9/4401 |
| 2021/0126774 A1* | 4/2021 | Galligan | H04L 63/0435 |
| 2021/0136082 A1* | 5/2021 | Andrews | H04L 63/105 |
| 2021/0232192 A1* | 7/2021 | Bhaskar | G06F 9/4401 |
| 2021/0349836 A1* | 11/2021 | Benedict | G06F 12/1433 |
| 2021/0352139 A1* | 11/2021 | Madisetti | H04L 9/50 |
| 2021/0406381 A1* | 12/2021 | Heisrath | H04L 63/123 |
| 2022/0166626 A1* | 5/2022 | Madisetti | H04L 9/50 |
| 2022/0207125 A1* | 6/2022 | Young | G06F 21/44 |
| 2022/0207145 A1* | 6/2022 | Young | G06F 21/575 |
| 2022/0222328 A1 | 7/2022 | Talib et al. | |
| 2022/0391513 A1* | 12/2022 | Ruffino | H04L 9/0894 |
| 2022/0391540 A1* | 12/2022 | Roberts | G06F 21/64 |
| 2022/0405394 A1* | 12/2022 | Boyapalle | G06F 21/31 |
| 2023/0125588 A1* | 4/2023 | Savage | H04L 9/3226 |
| | | | 713/175 |
| 2023/0127882 A1* | 4/2023 | Young | H04L 9/3234 |
| | | | 713/156 |
| 2023/0239165 A1* | 7/2023 | Young | H04L 9/3265 |
| | | | 713/175 |
| 2023/0306141 A1* | 9/2023 | Ramaiah | G06F 9/4416 |
| 2023/0325509 A1* | 10/2023 | Schroder | G06F 21/64 |
| | | | 726/26 |
| 2023/0342162 A1* | 10/2023 | Griffin | G06F 9/441 |
| 2023/0344845 A1* | 10/2023 | Cady | G06F 9/547 |
| 2023/0353391 A1* | 11/2023 | Dover | H04L 9/3268 |
| 2024/0004668 A1* | 1/2024 | Kaushik | G06F 9/4405 |
| 2024/0005004 A1* | 1/2024 | Abdulhamid | G06F 8/65 |
| 2024/0037239 A1* | 2/2024 | Liu | G06F 21/575 |
| 2024/0070007 A1* | 2/2024 | Jannusch | G06F 11/0772 |
| 2024/0070284 A1* | 2/2024 | Orlando | G06F 21/575 |
| 2024/0106644 A1* | 3/2024 | Katragada | H04L 63/06 |
| 2024/0111705 A1* | 4/2024 | Lewis | G06F 8/65 |
| 2024/0126905 A1* | 4/2024 | Goodman | H04L 9/3247 |
| 2024/0134767 A1* | 4/2024 | Gerhart | G06F 11/3058 |
| 2024/0134992 A1* | 4/2024 | Madala | G06F 21/575 |
| 2024/0134997 A1* | 4/2024 | Madala | G06F 8/65 |
| 2024/0135000 A1* | 4/2024 | Madala | G06F 21/577 |
| 2024/0135001 A1* | 4/2024 | Madala | G06F 21/577 |
| 2024/0135002 A1* | 4/2024 | Madala | G06F 21/577 |
| 2024/0143404 A1* | 5/2024 | Enomoto | G06F 21/30 |
| 2024/0143850 A1* | 5/2024 | Khatri | G06F 21/44 |
| 2024/0193309 A1* | 6/2024 | Wagner | G06F 21/72 |

(56) References Cited

U.S. PATENT DOCUMENTS

| | | | |
|---|---|---|---|
| 2024/0296235 A1* | 9/2024 | Bisa | G06F 21/602 |
| 2024/0297793 A1* | 9/2024 | Shroff | G06F 21/44 |
| 2024/0354391 A1* | 10/2024 | Veluthakkal | H04L 9/0891 |
| 2024/0364501 A1* | 10/2024 | He | H04L 9/006 |
| 2024/0403435 A1* | 12/2024 | Moore | G06F 21/575 |
| 2025/0007898 A1* | 1/2025 | Sawal | H04L 63/0807 |
| 2025/0021369 A1* | 1/2025 | Parekh | G06F 9/45558 |
| 2025/0045142 A1* | 2/2025 | Montero | G06F 15/7867 |
| 2025/0045143 A1* | 2/2025 | Montero | G06F 15/7867 |
| 2025/0047500 A1* | 2/2025 | Montero | H04L 9/3247 |
| 2025/0061203 A1* | 2/2025 | Datta | G06F 9/45558 |
| 2025/0103417 A1* | 3/2025 | Paulraj | G06F 11/0772 |
| 2025/0103755 A1* | 3/2025 | Cho | G06F 21/575 |
| 2025/0103756 A1* | 3/2025 | Paulraj | G06F 21/78 |
| 2025/0104092 A1* | 3/2025 | Paulraj | G06Q 30/018 |
| 2025/0130807 A1* | 4/2025 | Chaffin | G06F 9/30181 |
| 2025/0138839 A1* | 5/2025 | Teshome | H04L 67/306 |
| 2025/0138936 A1* | 5/2025 | Thiruchengode Vajravel | G06F 11/0778 |
| 2025/0138945 A1* | 5/2025 | Teshome | G06F 11/1415 |
| 2025/0139271 A1* | 5/2025 | Tonry | G06F 21/6218 |
| 2025/0141661 A1* | 5/2025 | Teshome | H04L 9/3247 |
| 2025/0141674 A1* | 5/2025 | Tonry | H04L 9/3247 |
| 2025/0141697 A1* | 5/2025 | Kollarapu | H04L 9/3263 |
| 2025/0141699 A1* | 5/2025 | Arora | H04L 63/18 |
| 2025/0141814 A1* | 5/2025 | Montero | H04L 47/781 |
| 2025/0141880 A1* | 5/2025 | Teshome | H04L 63/107 |
| 2025/0141888 A1* | 5/2025 | Teshome | H04L 63/1416 |
| 2025/0141924 A1* | 5/2025 | Arora | H04L 9/0825 |
| 2025/0141925 A1* | 5/2025 | Arora | H04L 63/18 |
| 2025/0141928 A1* | 5/2025 | El-Azzami | H04L 63/20 |
| 2025/0141929 A1* | 5/2025 | Tonry | H04L 63/20 |
| 2025/0142444 A1* | 5/2025 | Arora | H04W 28/0247 |

\* cited by examiner

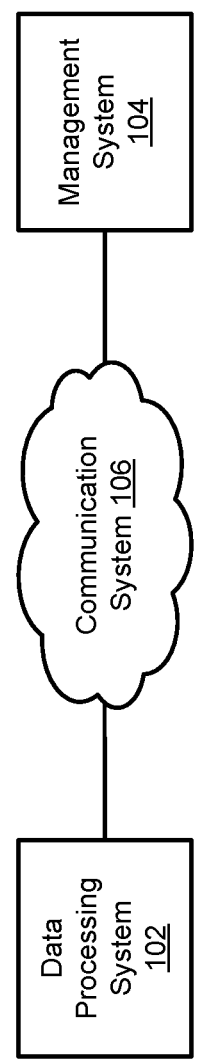

OUT OF BAND COMPONENT VALIDATION

FIELD

Embodiments disclosed herein relate generally to managing data processing systems. More particularly, embodiments disclosed herein relate to systems and methods for validating components of data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a distributed system in accordance with an embodiment.

DETAILED DESCRIPTION

Figure 1B:
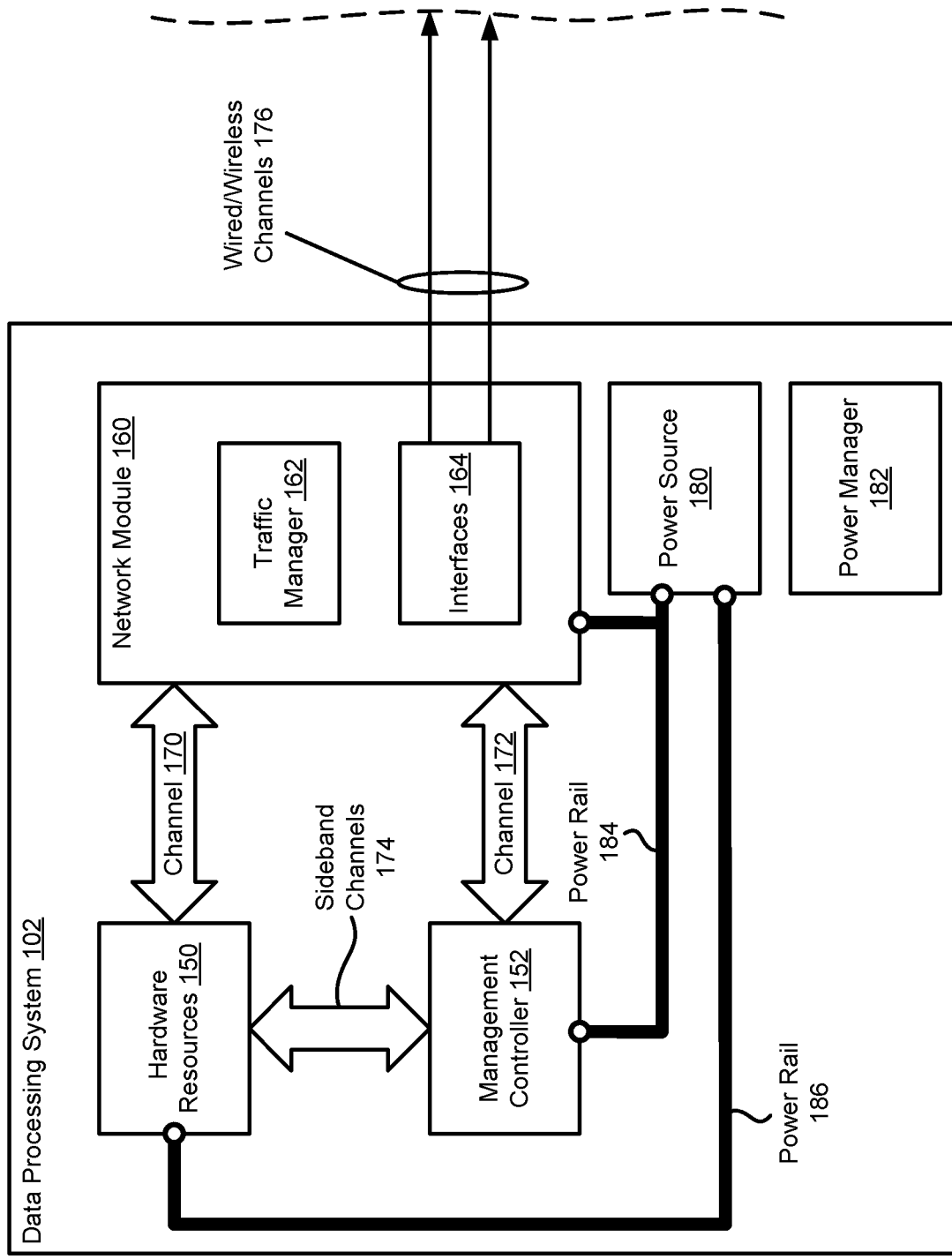
FIG. 1B shows a block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may be managed by verifying the integrity of the data processing systems prior to allowing the data processing systems to be used.

To verify the integrity of the data processing systems, each data processing system may host a management controller. The management controller may include a certificate or other data structure that includes information regarding hardware components expected to be present in the data processing system.

During startups of the data processing system, the actual component loadout may be compared to the expected hardware components to identify any differences. If any differences exist, then remedial activity may be initiated. The remedial activity may include sending various notifications to other devices regarding these differences, restricting use of the data processing system, limiting operation/activity of hardware components of the data processing system (e.g., unexpected components), etc.

The remedial activity may manage impact of the identified differences on operation of the data processing system. For example, by depowering, disabling, and/or otherwise limiting use of certain hardware components that are unexpected, these unexpected hardware components may have a more limited impact on the operation of the data processing system (and/or may prevent other components from being compromised by these unexpected components).

By doing so, embodiments disclosed herein may address, among others, the technical problem of changes in hardware components of a devices as it moves through the stream of commerce. By utilizing the management controller of the data processing system to identify unexpected components, compromise of the other hardware components may be less likely to prevent the data processing systems from addressing the impact of unexpected hardware components (or lack thereof).

In an embodiment, a method for managing operation of a data processing system is provided. The method may include starting, by hardware resources of the data processing system, a startup of the data processing system; during the startup: obtaining, by a management controller of the data processing system, component data for components of the hardware resources; performing, by the management controller, a validation of the components using the component data and a certificate to identify a validation state of the components; making, by the management controller, a determination regarding whether the components are validated based on the validation state; in a first instance of the determination where the components are not validated: reporting, by the management controller and using an out of band channel, a validation failure for the components; authorizing, by the management controller and based on the validation state, a remedial completion of the startup; and performing, by the hardware resources and based on the authorization of the remedial completion, the remedial completion of the start to manage the validation failure.

The method may also include, in a second instance of the determination where the components are validated: authorizing, by the management controller and based on the validation state, a nominal completion of the startup; and performing, by the hardware resources and based on the authorization of the nominal completion, the nominal completion of the start place the data processing system in a state in which desired computer implemented services are provided.

Performing the remedial completion may place the data processing system in a remedial state in which the desired computer implemented services are not provided.

Performing the remedial completion may retain management of the data processing system with a startup management entity, and performing the nominal completion may hand off management of the data processing system to an operation management entity.

The operation management entity may include an operating system.

The component data may be obtained via a sideband channel between the hardware resources and the management controller. The sideband channel may provide the management controller with management authority of the hardware resources.

The data processing system may include a network module adapted to separately advertise network endpoints for the management controller and hardware resources of the data processing system, the network endpoints being usable by remote entities to address communications to the hardware resources and the management controller.

The out of band channel may run through the network module, and an in-band channel that services the hardware resources may also run through the network module.

The management controller and the network module may be on separate power domains from the hardware resources so that the management controller and the network module may be operable while the hardware resources are inoperable.

The certificate may be a cryptographically verifiable data structure, and the data structure may include information usable to identify hardware components of the hardware resources present at a point in time in the past.

The point in time in the past may be when manufacturing of the data processing system is complete.

The component data may indicate hardware components of the hardware resources present at a second point in time. The validation of the components may include identifying differences between the hardware components of the hardware resources present at the point in time in the past and the hardware components of the hardware resources present at the second point in time. The second point in time may be a present time.

A non-transitory media may include instructions that when executed by a processor cause the computer implemented method to be performed.

The data processing system may include the non-transitory media and a processor, and may perform the computer implemented method when the computer instructions are executed by the processor.

Turning to FIG. 1A, a block diagram illustrating a distributed system in accordance with an embodiment is shown. The system shown in FIG. 1A may provide computer implemented services. The computer implemented services may include, for example, database services, data processing services, electronic communication services, and/or any other services that may be provided using one or more computing devices. Other types of computer implemented services may be provided by the system shown in FIG. 1A without departing from embodiments disclosed herein.

To provide the computer implemented services, various hardware devices may be required. For example, the computer implemented services may require access to hardware devices such as processors, memory modules, storage devices, communications devices, etc. The hardware components may support execution of any number and types of software components (e.g., applications), and, in some combination, these components may provide for various types of computer implemented services.

However, if access to the required hardware devices is unavailable, then the computer implemented services may be impacted. For example, the computer implemented services may not be provided or may be provided in an undesired manner if certain processors, memory, special purpose hardware devices such as graphics processing units, and/or other hardware components are unavailable.

Further, lack of a hardware component (or presence of an unexpected hardware component) may indicate that a host device has been modified in an unexpected manner. Such modifications may indicate that, for example, a malicious person has added, replaced, and/or removed a hardware component with respect to the host device. If operated with such unexpected hardware component, the operation of the host device may be compromised In general, embodiments disclosed herein may provide methods, systems, and/or devices for managing the operation of host device. To manage the operation of host devices, a management framework may be implemented. The management framework may facilitate identification and tracking of the expected hardware component loadouts (and/or software component, configuration, etc. loadouts) for the host devices to validate whether the actual loadout of a host device matches an expected loadout.

If a difference between the actual and expected loadout is identified, remedial actions may be taken as part of the management framework. The remedial action may include, for example, preventing certain processes (e.g., startups) from completing, modifying processes to complete in a different manner, notifying and/or otherwise reporting the differences to various persons and/or systems, and/or performing other actions to manage an impact of such differences on the operation of the host devices.

To improve the likelihood of the differences being identified, the actions performed to satisfy the management framework may be performed by (i) out of band components of the host system, and (ii) secured in-band components of the host system (e.g., startup management entities). By doing so, dependence on less secure in-band components (e.g., operating systems, drivers, agents present with the operating systems, etc.) of a host system for identification of differences may be reduced. Consequently, compromise of these less secure components may be less likely to compromise the ability of the host system to identify differences between expected and actual loadouts.

By doing so, a host device in accordance with an embodiment may be more likely to be able to provide desired computer implemented services through proactive and more secure identification of differences between actual and expected loadouts. Thus, the host systems may have, for example, improved uptime and reduced risk of compromise due to improved likelihood of identifying such differences, and corresponding remedial activity when such differences are identified.

To provide the above-mentioned functionality, the system of FIG. 1A may include data processing system 102 (e.g., an example of a host system), and/or management system 104. Each of these components is discussed below.

Data processing system 102 may provide (i) the computer implemented services and (ii) identify differences in actual versus expected component loadouts of its componentry. To do so, data processing system 102 may include out of band components (e.g., a management controller), in band component (e.g., processors, memory modules, storage devices, etc.). The in band components may host more secure software components (e.g., startup management entities such as basic input output systems (BIOSs)) and less secure software components (e.g., operating systems, drivers, other types of operation management entities) from time to time. The out of band components and the more secure software components may participate in the management framework to identify and manage differences (e.g., referred to as "component loadout differences") between expected and actual loadouts. For more information regarding components of data processing system 102, refer to the discussion of FIG. 1B.

Management system 104 may facilitate remediation of data processing system 102 when differences between actual and expected loadouts are identified, and facilitate such identifications. For example, management system 104 may be a system (e.g., cloud system, servers, etc.) operated by a manufacturer, warranty service provider, organization that owns data processing system 102, and/or hardware of another entity that may have some interest in see continued desirable operation of data processing system 102. Management system 104 may obtain information regarding component loadout differences for data processing system 102, and perform various actions to manage the impact of these differences. The actions may include, for example, distributing information regarding the component loadout differences to persons and/or systems, identifying and automatically causing various actions to be performed by data processing system 102 to address the component loadout differences, and/or other actions to manage the impact of the component loadout differences on operation of data processing system 102. To do so, management system 104 may store and provide various policies that indicate activity to be performed when such component loadout differences are identified. The component loadout differences may be used as keys to identify the corresponding action to be performed.

Figure 2:
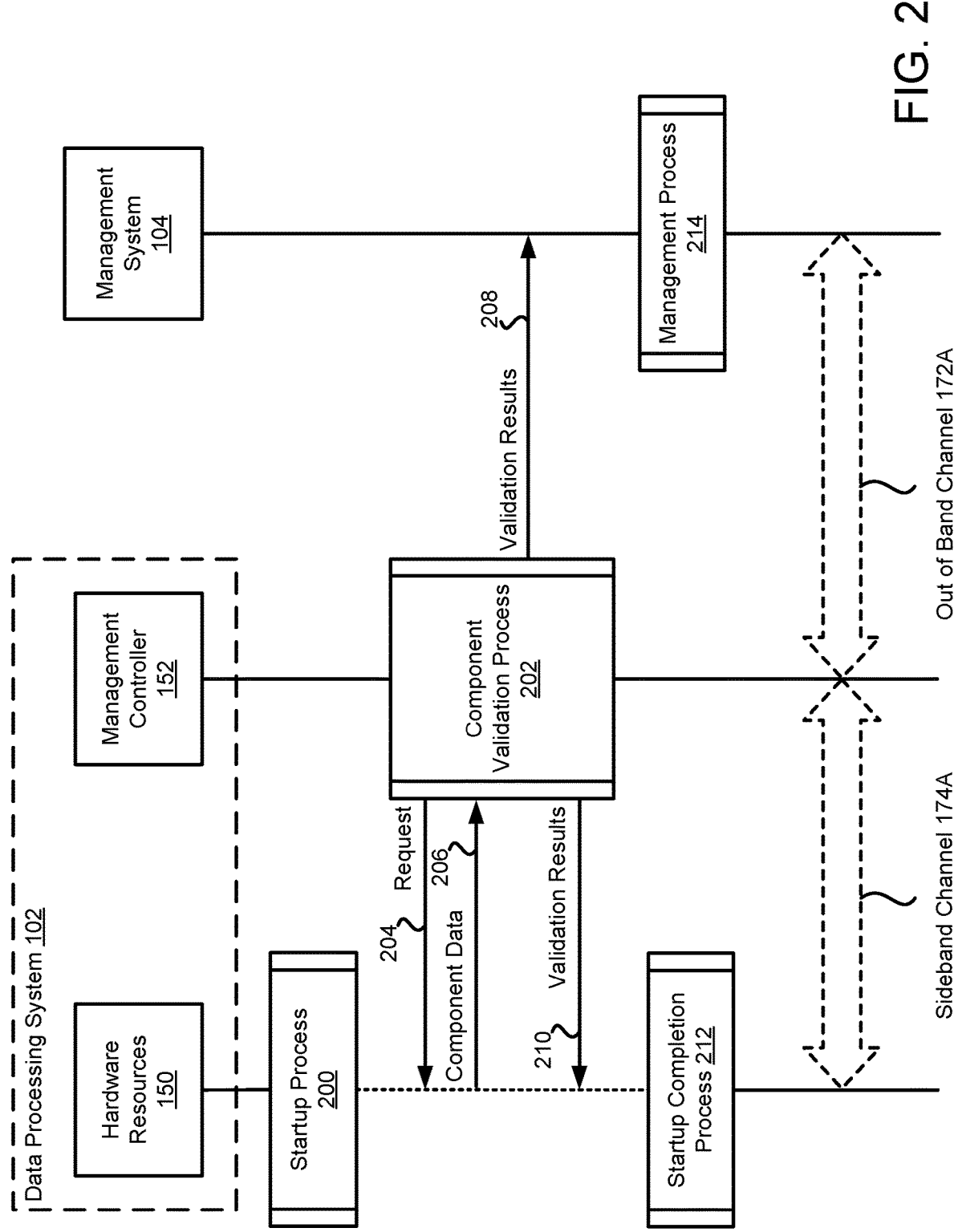
FIG. 2 shows an interaction diagram in accordance with an embodiment.
Figure 3:
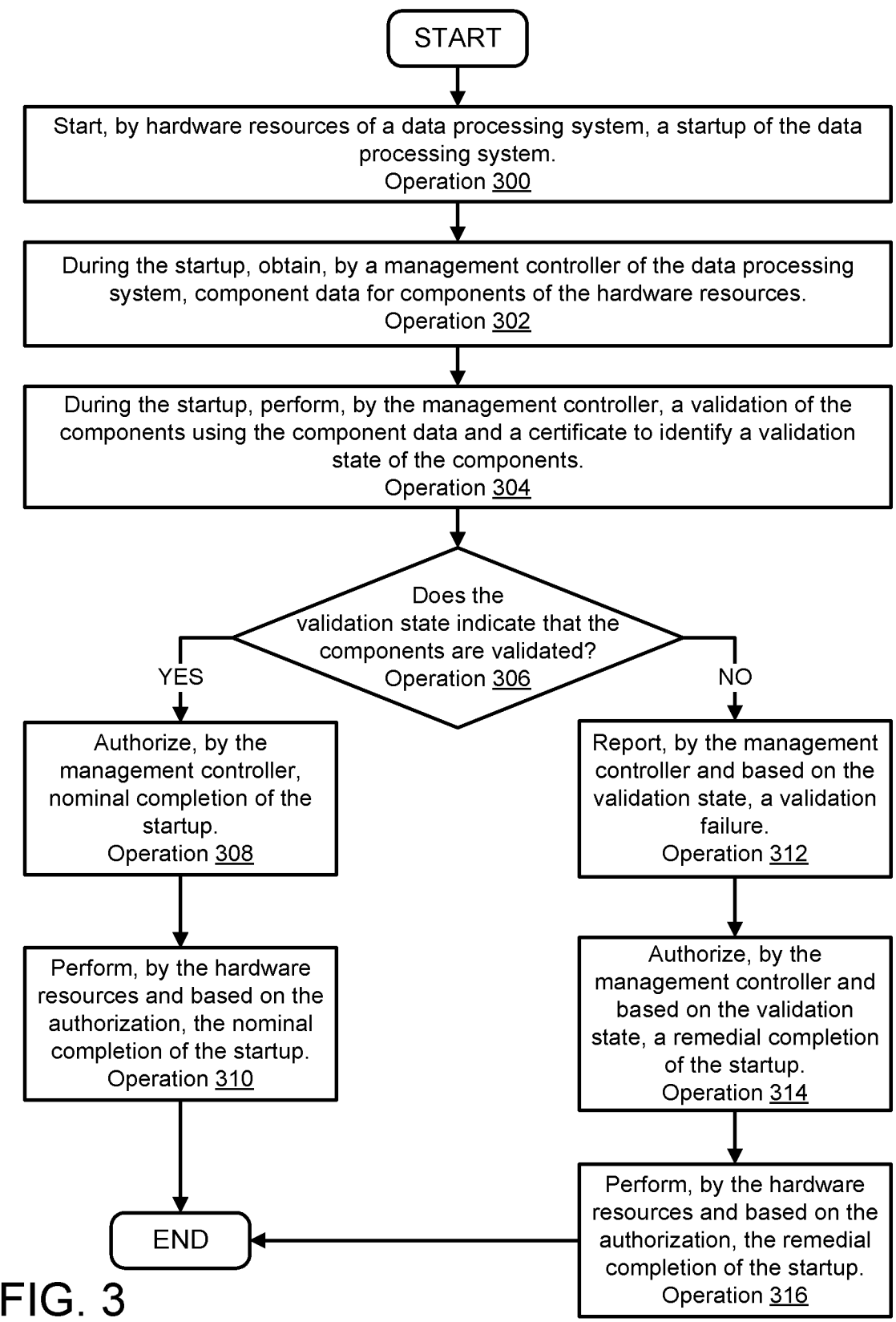
FIG. 3 shows a flow diagram illustrating a method in accordance with an embodiment.

When providing their functionality, any of data processing system 102 and/or management system 104 may perform all, or a portion of the processes, interactions, and/or methods shown in FIGS. 2-3.

Any of (and/or components thereof) data processing system 102 and/or management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing system 102 and/or management system 104 are implemented using an edge system or an internet of things (IoT) device, which may include a computing device. The IoT device may operate in accordance with a communication model and/or management model known to data processing system 102, management system 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein. For example, while the system of FIG. 1A shows a single data processing system (e.g., 102), it will be appreciated that the system may include any number of data processing systems.

Turning to FIG. 1B, a diagram illustrating a data processing system in accordance with an embodiment is shown. The data processing system (e.g., data processing system 102) shown in FIG. 1B may be similar to any of the computing devices (e.g., data processing system 102) shown in FIG. 1A.

To provide computer implemented services, data processing system 102 may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 102) to another device via any number of intermediate networks (e.g., via wired/wireless channels 176 that are part of the networks).

Further, one additional avenue to compromise the in-band components may be through replacement, add, and/or remove of a hardware component of hardware resources 150. These changes from an expected component loadout may cause any of the in-band components (whether software or hardware) to be compromised (e.g., under control of a malicious party, performs undesired actions for other reasons, and/or otherwise operates in a manner that diverges from nominal operation).

To reduce the likelihood of the applications and/or other in-band entities from being indirectly compromised, data processing system 102 may include management controller 152 and network module 160. Each of these components of data processing system 102 is discussed below.

Management controller 152 may be implemented, for example, using a system on a chip or other type of independently operating computing device (e.g., independent from the in-band components, such as hardware resources 150 of a host data processing system 102). Management controller 152 may provide various management functionalities for data processing system 102. For example, management controller 152 may monitor hardware components of hardware resources 150 to identify component loadout differences, monitor various ongoing processes performed by the in-band components, may manage power distribution, thermal management, and/or may perform other functions for managing data processing system 102 (e.g., enforce sanitization policies). If a component loadout difference is identified, management controller 152 may perform any of the operations, processing, and/or data flows discussed with respect to FIGS. 2-3.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels such as 174A shown in FIG. 2). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

Figure 1C:
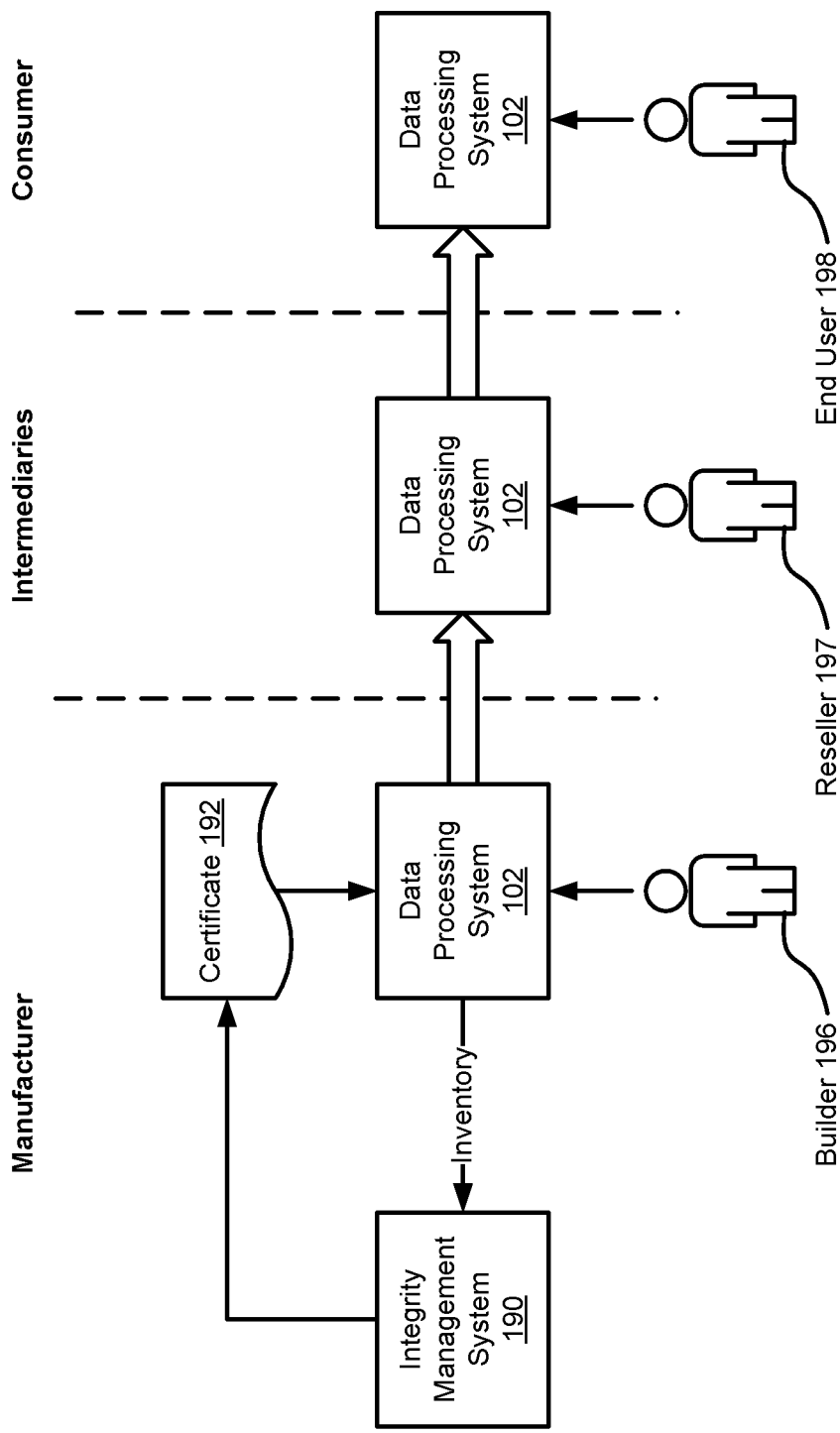
FIG. 1C shows a block diagram illustrating moving of a data processing system through a stream of commerce in accordance with an embodiment.

Using the information regarding the other components obtained via sideband channels 174, component loadout differences may be identified by comparing the information to information included in a certificate or other trusted data structure stored in management controller 152. Refer to FIG. 1C for additional details regarding certificates used by management controller 152.

Management controller 152 may be operably connected to communication components of data processing system 102 via separate channels (e.g., 172, 172A) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

For example, if hardware resources 150 are compromised as part of an attack to access sensitive data stored by data processing system 102, management controller 152 may not need to rely on hardware resources 150 to provide notifications to other devices to other devices regarding component loadout differences to address the impact of such component loadout differences.

To facilitate communication with other devices, data processing system 102 may include network module 160. Network module 160 may provide communication services for in-band components and out of band components (e.g., management controller 152) of data processing system 102. To do so, network module 160 may include traffic manager 162, and interfaces 164.

Traffic manager 162 may include functionality to (i) discriminate traffic directed to various network endpoints advertised by data processing system 102, and (ii) forward the traffic to/from the entities associated with the different network endpoints. For example, to facilitate communications with other devices, network module 160 may advertise different network endpoints (e.g., different media access control address/internet protocol addresses) for the in-band components and out of band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may not flow through any of the in-band components (i.e., hardware resources 150). Likewise, outbound traffic from the out of band components may not flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These component may support any number of wired/wireless channels 176.

Thus, from the perspective of an external device, the in-band components and out of band components of data processing system 102 may appear to be two independent network entities that may be independently addressable and/or otherwise unrelated to one another.

To facilitate management of data processing system 102 over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Therefore, if a portion of hardware resources 150 become unavailable (e.g., due to being unpowered) then out of band components may remain powered, allowing management controller 152 to obtain data (e.g., sanitization policies, authorizations for performing sanitization processes) through out of band communications via a network (e.g., from management system 104) and/or to perform processes (e.g., sanitization processes).

To implement the separate power domains, data processing system 102 may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) that may manage power from power source 180 may be supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

While illustrated as including a limited number of specific components, it will be appreciated that a data processing system may include additional, different, and/or fewer components without departing from embodiments disclosed herein.

To provide its functionality, management controller 152 may use a cryptographically verifiable data structure (or other type of data structure) to identify component loadout differences. Such data structures may be established during manufacturing and over time as authorized changes in components loadouts are made.

Turning to FIG. 1C, a diagram illustrating a process through which a management controller may obtain a certificate in accordance with an embodiment is shown. In FIG. 1C, a selection of some different phases of the lifecycle of data processing system 102 are shown.

The lifecycle of data processing system 102 may start while with a manufacturer. While with the manufacturer, a builder (e.g., 196) may add hardware components to data processing system 102 to complete the hardware resources.

When so completed, an integrity management system 190 may identify the hardware components of the hardware resources. Using the identified hardware resources, certificate 192 may be obtained. Certificate 192 may be a signed data structure that includes information usable to discriminate expected from unexpected components of data processing system 102. For example, certificate 192 may include a list of identifiers, signatures (e.g., hashes of firmware code or other readable data), and/or other information that allows any component of data processing system 102 to be validated as being expected or unexpected.

Certificate 192 may be signed with a key trusted by the management controller of data processing system 102. For example, a public key corresponding to a private key used to sign certificate 192 may be included in an extensible firmware interface (EFI) repository (or other type of repository) that is measured by a trusted platform module (TPM) of the data processing system. Thus, the integrity of the EFI repository may be validated by the TPM, and the key in the EFI repository may be used by the management controller to validate that certificate 192 is to be trusted.

Once generated, certificate 192 may be stored with the management controller and/or stored in an accessible location so that the management controller may access the certificate (e.g., at least during startups of data processing system 102.

Once manufactured, data processing system 102 be placed into the stream of commerce. For example, data processing system 102 may be sold to various intermediaries at which point a reseller 197 may have physical access to data processing system 102. Any number of intermediaries may be in the stream of commerce until data processing system 102 reaches a consumer. The consumer may be an individual or an organization.

Once there, an end user 198 may have physical access to data processing system 102.

Because reseller 197, end user 198, and/or other persons may have physical access to data processing system 102, any of the hardware components may be replaced or removed, and/or new hardware components may be added. These changes in hardware components may be unexpected with respect to certificate 192.

To manage such changes in hardware components, the management framework may be used to identify and address component loadout differences from that expected by data processing system 102.

To further clarify embodiments disclosed herein, an interaction diagram in accordance with an embodiment is shown in FIG. 2. The interaction diagram may illustrate examples of how data may be obtained and used within the systems of FIGS. 1A-1C.

In the interaction diagram, processes performed by and interactions between components of a system in accordance with an embodiment are shown. In the diagram, components of the system are illustrated using a first set of shapes (e.g., 150, 152, etc.), located towards the top of each figure. Lines descend from these shapes. Processes performed by the components of the system are illustrated using a second set of shapes (e.g., 200, 202 etc.) superimposed over these lines. A portion of the line descending from hardware resources 150 is drawn in dashing to indicate that a startup may be being performed.

Interactions (e.g., communication, data transmissions, etc.) between the components of the system are illustrated using a third set of shapes (e.g., 204, 206, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

Turning to FIG. 2, an interaction diagram in accordance with an embodiment is shown. The interaction diagram may illustrate flows of data and processing of data performed during startups of data processing system 102 to manage component loadout differences.

To manage component loadout differences, startup process 200 may be performed. During startup process, hardware resources 150 may perform a secure process where (i) the hardware loadout, (ii) software components, (iii) configuration of hardware/software component, and/or other entities are powered and prepared for handoff to management by a less secure management entity. For example, a startup management entity may begin to execute and may perform various actions to place hardware resources 150 in condition to handoff to the management entity.

During the startup process, various validation actions may be performed. For example, computer instructions for various software may be validated using images, keys, and/or other data structures stored in various repositories managed in part using the TPM (e.g., which may verify the content of the repositories, and limit use of secrets/other data structures depending on the extent to which the repositories and/or other data structures may be validated such as through hash matching). Similar validations may be performed for configurations for hardware/software components and/or other data structures.

During startup process 200, component validation process 202 may be initiated by management controller 152. During component validation process 202, at interaction 204, a request for the hardware component loadout of hardware resources 150 may be sent to the startup management entity (e.g., a BIOS). The startup management entity may, at interaction 206, provide component data that includes the hardware component loadout (e.g., by inventorying the hardware components of hardware resources 150).

Once obtained, the component data and information included in the certificate may be compared to identify whether any component loadout differences are present. If any component loadout differences are present, then, at interactions 208 and 210, validations results may be provided to management system 104 and the startup management entity, respectively, indicate the presence of the component loadout differences.

Responsive to the validation results, startup completion process 212 may be performed. During startup completion process 212, the startup initiated by startup process 200 may be completed. The manner of completion may depend on whether the validation results indicate that any component loadout differences are present.

If the validation results indicate that component load out differences are present, then startup completion process 212 may treat the validation results as an indication/request to complete the startup in a particular manner to manage impact of the component loadout differences. For example, rather than completing the startup process by handing off management of data processing system 102 to an operation management entity, startup completion process 212 may instead limit the functionality of data processing system 102.

For example, a remedial completion may be performed. In the remedial completion, an error message may be displayed on a display of data processing system 102 indicating that the hardware components of hardware resources 150 cannot be validated. Other information may also be provided such as, for example, identifiers for the hardware components that cannot be validated, contact information for management system 104 and/or service representative of an entity that has an interest in maintaining operation of data processing system 102, etc.

The operation of data processing system 102 may remain locked until the hardware components of hardware resources 150 can be validated. Thus, desired computer implemented services may not be provided until the hardware components of hardware resources 150 can be validated.

If the validation results indicate that no component loadout differences are present, then startup completion process 212 may treat the validation results as an indication/request to complete the startup in a nominal manner. In other words, startup completion process 212 may result in eventual handoff of management of data processing system 102 to an operation management entity which may host various applications that provide the desired computer implemented services.

Likewise, management system 104 may perform similar processes (e.g., management process 214) if the validation results provided to it indicate that component loadout differences are present. For example, if present, management process 214 may include sending various notifications to administrators/technicians/other persons, initiating automated remediation techniques (e.g., depowering/repowering hardware components of hardware resources 150 to attempt to address any misreporting of the actual hardware loadout of hardware resources 150, if present), document the condition of data processing system 102, and/or perform various actions to manage the impact of component loadout differences. However, if no component loadout differences are present, then management process 214 may only include various actions to document the state of data processing system 102 (e.g., recording the validation results of interaction 208).

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2 may perform various methods to manage the operation of data processing systems.

Turning to FIG. 3, a flow diagram illustrating a method for managing a data processing system in accordance with an embodiment is shown. The method illustrated in FIG. 3 may be performed by the components of the system of FIGS. 1A-2 and/or may be performed by a data processing system and/or another device. In the diagram discussed below and shown in FIG. 3, any of the operations may be repeated, performed in different orders, and/or performed in parallel with or in a partially overlapping in time manner with other operations.

At operation 300, a startup of the data processing system is started by hardware resources of the data processing system. The startup may be started by loading code corresponding to a startup management entity into a processor and beginning execution of the code. The startup management entity may manage the startup.

At operation 302, during the startup, component data for components of the hardware resources may be obtained by a management controller of the data processing system. The component data may be obtained by reading it from storage, receiving it from the hardware resources, and/or via other methods.

At operation 304, during the startup, a validation of the components is performed by the management controller. The validation may be performed using the component data and a certificate (or other type of verifiable data structure). The validation may identify a validation state of the components. The validation state may be validated or unable to be validated.

The validation may be performed by comparing the component data to content of the certificate, which may specify an expected component loadout for the hardware resources. Differences between the component data and the certificate may be identified and used as component loadout differences. If any component loadout differences are identified during the comparing, then the validation state of the component may be unable to be validated.

At operation 306, a determination is made regarding whether the validation state indicates that all components are validated. The validation state may indicate that all components are validated when the validation state is validated, and the opposite when the validation state is unable to be validated.

If the validate state indicates that the components are validated, then the method may proceed to operation 308 following operation 306. Otherwise the method may proceed to operation 312 following operation 306.

At operation 308, nominal completion of the startup is authorized by the management controller. The nominal completion may be authorized by sending a message to the startup management entity indicating that the nominal startup is authorized. A nominal startup may be the normal, or expected startup, and may include loading an operation management entity and handing off management authority to the operation management entity. In turn, various applications may be loaded as part of handoff.

At operation 310, the nominal completion of the startup is performed by the hardware resources based on the authorization. The nominal completion may be performed by continued operation of the startup management entity following the authorization.

The method may end following operation 310.

Following operation 310, the application may begin to provide desired computer implemented services, and the data processing system may be in a generally usable state of operation by end users.

Returning to operation 306, the method may proceed to operation 312 following operation 306 when the validation state indicates that not all of the components are validated.

At operation 312, a validation failure is reported by the management controller based on the validation state. The validation failure may be reported by sending information via an out of band channel to one or more other devices. The validation failure may indicate that the hardware component validation for the hardware resources has failed.

At operation 314, remedial completion of the startup is authorized by the management controller. The remedial completion may be authorized by sending a message to the startup management entity indicating that the remedial startup is authorized. A remedial startup may be a startup that mitigates impact of component loadout differences. The remedial completion may include displaying information regarding the component loadout differences, information regarding how the component loadout differences may be addressed, and not handing off operation to operation management entities so that the data processing system does not attempt to provide computer implemented services while the components are not validated.

At operation 316, the remedial completion of the startup is performed by the hardware resources based on the authorization. The remedial completion may be performed by continued operation of the startup management entity following the authorization, which may perform different actions to complete the startup from other actions that may be performed to perform a nominal completion of the startup.

The method may end following operation 316.

Figure 4:
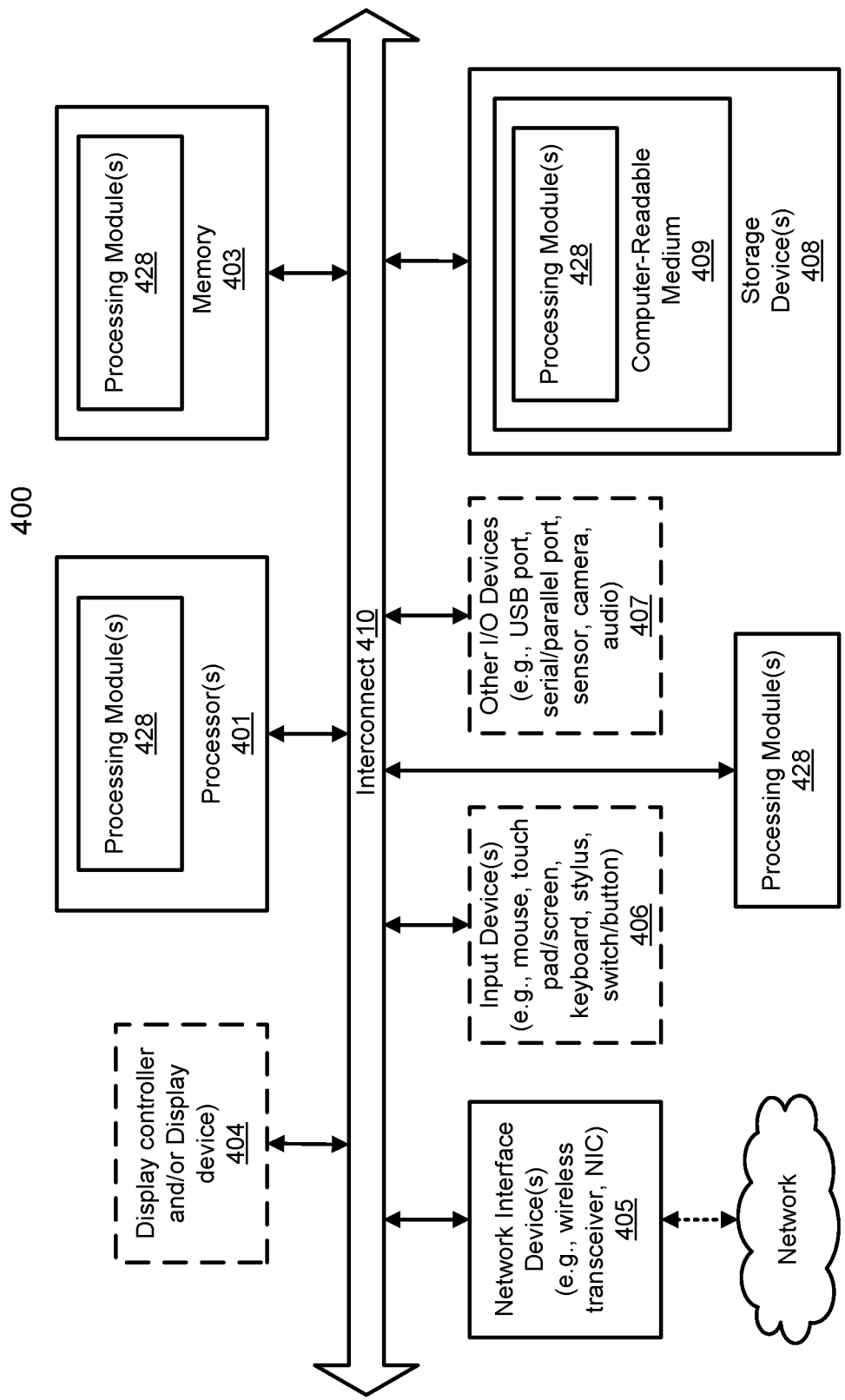
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
   starting, by hardware resources of the data processing system, a startup of the data processing system, the hardware resources hosting a startup management entity of the data processing system that manages the startup of the data processing system;
   during the startup:
      obtaining, by a management controller of the data processing system, component data for components of the hardware resources;
      performing, by the management controller, a validation of the components using the component data and a certificate to identify a validation state of the components;
      making, by the management controller, a determination regarding whether the components are validated based on the validation state;
      in a first instance of the determination where the components are not validated:
         reporting, by the management controller and using an out of band channel, a validation failure for the components;
         authorizing, by the management controller and based on the validation state, the startup management entity to perform a remedial completion of the startup to manage the validation failure; and
         preventing, by the startup management entity based on the authorization of the remedial completion of the startup and as part of the remedial completion of the startup, the data processing system from providing computer implemented services while the components are not validated.

2. The method of claim 1, further comprising:
   in a second instance of the determination where the components are validated:
      authorizing, by the management controller and based on the validation state, the startup management entity to perform a nominal completion of the startup; and
      performing, by the startup management entity and based on the authorization of the nominal completion, the nominal completion of the startup to place the data processing system in a state in which desired computer implemented services are provided.

3. The method of claim 2, wherein performing the remedial completion places the data processing system in a remedial state in which the desired computer implemented services are not provided.

4. The method of claim 3, wherein performing the remedial completion retains management of the data processing system with the startup management entity, and performing the nominal completion hands off management of the data processing system from the startup management entity to an operation management entity, the startup management entity being a basic input/output system (BIOS) of the data processing system.

5. The method of claim 4, wherein the operation management entity comprises an operating system.

6. The method of claim 1, wherein the component data is obtained via a sideband channel between the hardware resources and the management controller, the sideband channel providing the management controller with management authority of the hardware resources.

7. The method of claim 1, wherein the data processing system comprises a network module adapted to separately advertise network endpoints for the management controller and hardware resources of the data processing system, the network endpoints being usable by remote entities to address communications to the hardware resources and the management controller.

8. The method of claim 7, wherein the out of band channel runs through the network module, and an in-band channel that services the hardware resources also runs through the network module.

9. The method of claim 8, wherein the management controller and the network module are on separate power domains from the hardware resources so that the management controller and the network module are operable while the hardware resources are inoperable.

10. The method of claim 1, wherein the certificate is a cryptographically verifiable data structure, and the data structure comprises information usable to identify hardware components of the hardware resources present at a point in time in the past.

11. The method of claim 10, wherein the point in time in the past is when manufacturing of the data processing system is complete.

12. The method of claim 11, wherein the component data indicates hardware components of the hardware resources present at a second point in time, the validation of the components comprises identifying differences between the hardware components of the hardware resources present at the point in time in the past and the hardware components of the hardware resources present at the second point in time, and the second point in time is a present time.

13. A non-transitory machine-readable medium having instructions stored therein, which when executed by a processor, cause the processor to perform operations for managing operation of a data processing system, the operations comprising:
  starting, by hardware resources of the data processing system, a startup of the data processing system, the hardware resources hosting a startup management entity of the data processing system that manages the startup of the data processing system;
  during the startup:
    obtaining, by a management controller of the data processing system, component data for components of the hardware resources;
    performing, by the management controller, a validation of the components using the component data and a certificate to identify a validation state of the components;
    making, by the management controller, a determination regarding whether the components are validated based on the validation state;
    in a first instance of the determination where the components are not validated:
      reporting, by the management controller and using an out of band channel, a validation failure for the components;
      authorizing, by the management controller and based on the validation state, the startup management entity to perform a remedial completion of the startup to manage the validation failure; and
      preventing, by the startup management entity based on the authorization of the remedial completion of the startup and as part of the remedial completion of the startup, the data processing system from providing computer implemented services while the components are not validated.

14. The non-transitory machine-readable medium of claim 13, further comprising:
  in a second instance of the determination where the components are validated:
    authorizing, by the management controller and based on the validation state, the startup management entity to perform a nominal completion of the startup; and
    performing, by the startup management entity and based on the authorization of the nominal completion, the nominal completion of the startup to place the data processing system in a state in which desired computer implemented services are provided.

15. The non-transitory machine-readable medium of claim 14, wherein performing the remedial completion places the data processing system in a remedial state in which the desired computer implemented services are not provided.

16. The non-transitory machine-readable medium of claim 15, wherein performing the remedial completion retains management of the data processing system with the startup management entity, and performing the nominal completion hands off management of the data processing system from the startup management entity to an operation management entity, the startup management entity being a basic input/output system (BIOS) of the data processing system.

17. A data processing system, comprising:
  a processor; and
  a memory coupled to the processor to store instructions, which when executed by the processor, cause the data processing system to perform operations, the operations comprising:
    starting, by hardware resources of the data processing system, a startup of the data processing system, the hardware resources hosting a startup management entity of the data processing system that manages the startup of the data processing system;
    during the startup:
      obtaining, by a management controller of the data processing system, component data for components of the hardware resources;

performing, by the management controller, a validation of the components using the component data and a certificate to identify a validation state of the components;

making, by the management controller, a determination regarding whether the components are validated based on the validation state;

in a first instance of the determination where the components are not validated:

reporting, by the management controller and using an out of band channel, a validation failure for the components;

authorizing, by the management controller and based on the validation state, the startup management entity to perform a remedial completion of the startup to manage the validation failure; and preventing, by the startup management entity based on the authorization of the remedial completion of the startup and as part of the remedial completion of the startup, the data processing system from providing computer implemented services while the components are not validated.

18. The data processing system of claim 17, further comprising:

in a second instance of the determination where the components are validated:

authorizing, by the management controller and based on the validation state, the startup management entity to perform a nominal completion of the startup; and performing, by the startup management entity and based on the authorization of the nominal completion, the nominal completion of the startup to place the data processing system in a state in which desired computer implemented services are provided.

19. The data processing system of claim 18, wherein performing the remedial completion places the data processing system in a remedial state in which the desired computer implemented services are not provided.

20. The data processing system of claim 19, wherein performing the remedial completion retains management of the data processing system with the startup management entity, and performing the nominal completion hands off management of the data processing system from the startup management entity to an operation management entity, the startup management entity being a basic input/output system (BIOS) of the data processing system.

* * * * *